United States Patent [19]

Briggs

[11] Patent Number: 4,950,001
[45] Date of Patent: Aug. 21, 1990

[54] GRADUATED FRICTION ANCHOR

[75] Inventor: Kerry D. Briggs, South Berwick, Me.

[73] Assignee: Simplex Wire & Cable, Portsmouth, N.H.

[21] Appl. No.: 131,768

[22] Filed: Dec. 11, 1987

[51] Int. Cl.$^5$ ............................................. F16L 39/02
[52] U.S. Cl. ..................................... 285/149; 285/255
[58] Field of Search .............. 285/149, 249, 255, 259; 138/109

[56] References Cited

U.S. PATENT DOCUMENTS

| | | | |
|---|---|---|---|
| 2,150,471 | 3/1939 | Van Vulpen | 285/149 |
| 2,481,001 | 9/1949 | Burckle | 285/149 |
| 2,485,049 | 10/1949 | Hollisy | 285/149 |
| 2,753,196 | 7/1956 | Melsom | 285/339 |
| 2,809,056 | 10/1957 | Kaiser | 285/149 |
| 2,940,778 | 6/1960 | Kaiser | 285/255 |
| 3,306,637 | 2/1967 | Pren et al. | 285/249 X |
| 4,123,088 | 10/1978 | Tanaka | 285/149 |
| 4,180,103 | 12/1979 | Mollere | 138/109 |
| 4,649,960 | 3/1987 | Policelli | 285/149 X |

Primary Examiner—Dave W. Arola
Attorney, Agent, or Firm—Austin R. Miller

[57] ABSTRACT

A graduated friction anchor ring for a coupling mounted on an end of a composite pipe having a pipe core and an aramid fiber layer, the aramid fiber layer possessing poor crush resistance properties and the graduated friction anchor ring being integrally positioned within the coupling to securely and delicately anchor the aramid fiber layer in conjunction with a wedge ring. The graduated friction anchor ring comprises an anchor ring, having outer and inner surfaces and an end portion connecting the surfaces, the inner surface being inclined with respect to the surface of the wedge ring, the aramid fiber layer being positioned intermediate the anchor ring and the pipe core, the wedge ring being wedged within the pipe core to wedge the aramid fiber layer between the pipe core and the anchor ring to generate graduated compression along the aramid fiber layer in a longitudinal direction.

11 Claims, 1 Drawing Sheet

GRADUATED FRICTION ANCHOR

FIELD OF THE INVENTION

This invention relates to couplings for high pressure, high tensile strength flexible composite pipe, and specifically to a graduated friction anchor for securely anchoring aramid fiber pipe layers.

The need for new heavy duty pipes capable of withstanding demanding operating conditions and varying environmental situations has led to innovative ways of reinforcing either existing pipes or new pipes. The use of steel armor wire as reinforcing material has been known in the art. Today, it is also known in the art to utilize aramid fiber materials as reinforcement for piping either alone or in concert with traditional steel armor wire.

Anchoring steel armor wire at the end of a pipe in a coupling has been accomplished by crimping or bending around a coupling piece. Holes can be drilled in the wire with a screw to be inserted therein or a screw can apply direct pressure against the wire. Also, the wire may be embedded in epoxy resins, or various combinations of these features may be used.

However, when used as layers in flexible pipe, the synthetic aramid fibers differ greatly from steel armor wire in many respects. In tensile load, aramid fibers have several times the strength of steel when compared on an equal weight basis. This is extremely important when considering that flexible pipes and hoses must frequently be bent, wound, straightened out and otherwise maneuvered about and in many instances would be of little use if they were too heavy or inflexible.

For use in flexible pipe we have found that, while strong in tension, aramid fibers are extremely limited in their ability to resist crushing. They have been found, in flexible pipe service, to be quite delicate when compared to steel. Their abrasion resistance is poor, especially relative to self-abrasion caused by bending, winding, etc., and their resistance to external cutting is also poor when used as a composite layer in flexible pipe. This has now been found to result from a particular susceptibility to pressure or friction applied at a single, localized point.

Because of this, traditional methods for anchoring steel armor wire have now been found to be ineffective for aramid fibers. Even where the anchoring process occurs over a distance such as in the case where the fibers are embedded in epoxy resin, there are still one or more particularly vulnerable points, one being the point where the epoxy bed is terminated. At that point, subsequent bending stresses tend to break the aramid fiber layer. Since the fiber strands are so small, other anchoring methods such as drilling holes is ineffective.

Another important aspect of a coupling that can anchor delicate pipe reinforcement layers is the ease in which the coupling can be assembled. Cost and time can often be critical factors in the required use of the piping system and coupling in which the graduated friction anchor is placed. It is an object of the invention to provide an anchoring means for aramid fiber layers in a flexible piping system which makes it possible for the system to be deployed in a very short time.

DESCRIPTION OF THE PRIOR ART

U.S. Pat. No. 2,940,778 discloses a fitting for use on a rubber or plastic hose. This fitting utilizes a wedge shaped ring to anchor the rubber inner core. The core is pressed by the wedge on one side and a nipple on the other which is positioned inside of the core. The wedge pretensions the core before pressure is applied, but is kept in place to prevent leakage by the same internal pressure being exerted against the widest end of the wedge.

However, the wedge fails to eliminate the undesired localized stress created at either edge. There is constant pressure throughout the length of the wedge and then none at the edge. Over time, any bending stresses tend to break aramid fibers.

U.S. Pat. No. 4,123,088 discloses a coupling which anchors a reinforcing layer by folding it over a bead wire. The layer surrounds the bead wire, and then both the layer and the bead wire are compressed between a rib and a metal ring. Pressure is created by driving a plurality of bolts through a support base and against the metal ring.

This coupling utilizes the traditional anchoring methods that have been found to be wholly ineffective. Both the ring and the rib have sharp edges that concentrate localized pressure on the layer to be anchored. Such pressures would tend to abrade an aramid fiber layer quickly.

U.S. Pat. No. 2,753,196 discloses a coupling for flexible multi-layered hoses. A metal ring is provided to anchor a reinforcing layer contained within the hose. The ring is placed radially outward of the layer, with a portion of the layer being folded back over the ring. Both the layer and the ring are then placed within a groove in a sleeve which then wedges the layer between the metal ring and the sleeve.

However, there is a failure to apply gradual pressure so as to eliminate localized stress points. Furthermore, the layer encounters at least one edge as it is anchored, which edge or edges are sharp. This is completely unsatisfactory when attempting to anchor an aramid fiber layer.

OBJECTS OF THE INVENTION

Thus, it is an object of the present invention to provide a graduated friction anchor capable of anchoring or terminating an aramid fiber reinforcing layer that does not substantially decrease the strength of the fibers.

It is another object of the present invention to provide a graduated friction anchor that anchors or terminates an aramid fiber reinforcing layer while retaining the full fiber strength both within and adjacent to it.

It is an important object of the present invention to provide a graduated friction anchor that anchors or terminates an aramid fiber reinforcing layer that does not apply high bending stresses or localized compressive stresses to the fibers.

It is another important objective of the present invention to provide a graduated friction anchor that anchors or terminates an aramid fiber reinforcing layer which requires no special power tools for crimping.

Other objects and advantages of the present invention will further become apparent.

SUMMARY OF THE INVENTION

The present invention provides a coupling with a graduated friction anchor for delicately yet securely anchoring aramid fiber reinforcing layers contained within high pressure, high tensile strength flexible composite pipe which can be assembled cheaply and quickly.

The anchor ring of the coupling has outer and inner surfaces and an end portion connecting the surfaces, with the inner surface being inclined with respect to the surface of the wedge ring, and the aramid fiber layer being positioned intermediate the anchor ring and the pipe core. The wedge ring is wedged within the pipe core to wedge the aramid fiber layer between the pipe core and the anchor ring, thereby generating graduated compression along the aramid fiber layer in a longitudinal direction.

DESCRIPTION OF A PREFERRED EMBODIMENT

Figure 1:
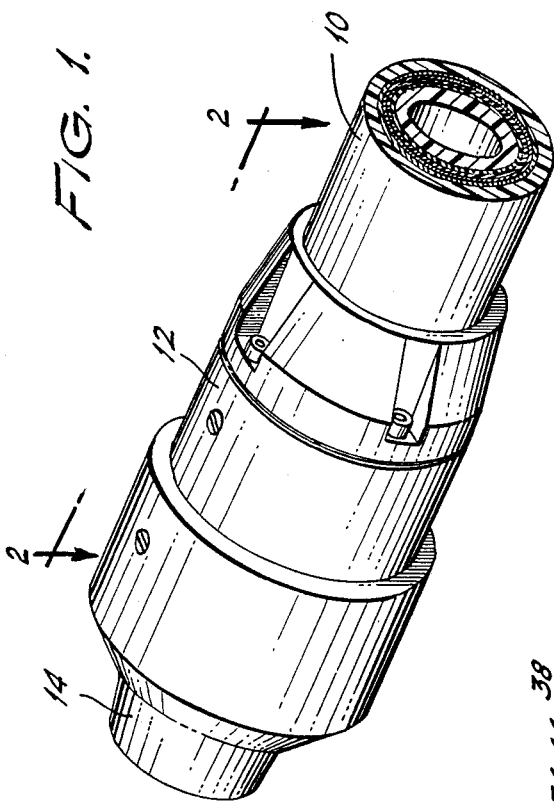
FIG. 1 represents a perspective view of the exterior of one form of coupling embodying features of this invention, shown as mounted on a flexible composite pipe.

Referring to FIG. 1, the exterior of a coupling 12 is shown as it is mounted on composite pipe 10. Coupling lip 14 threads on to another coupling piece known as a "quick disconnect" which is in conventional use per se and is not shown. Thus, two sections of pipe with couplings 12 mounted thereon may be coupled together.

Figure 2:
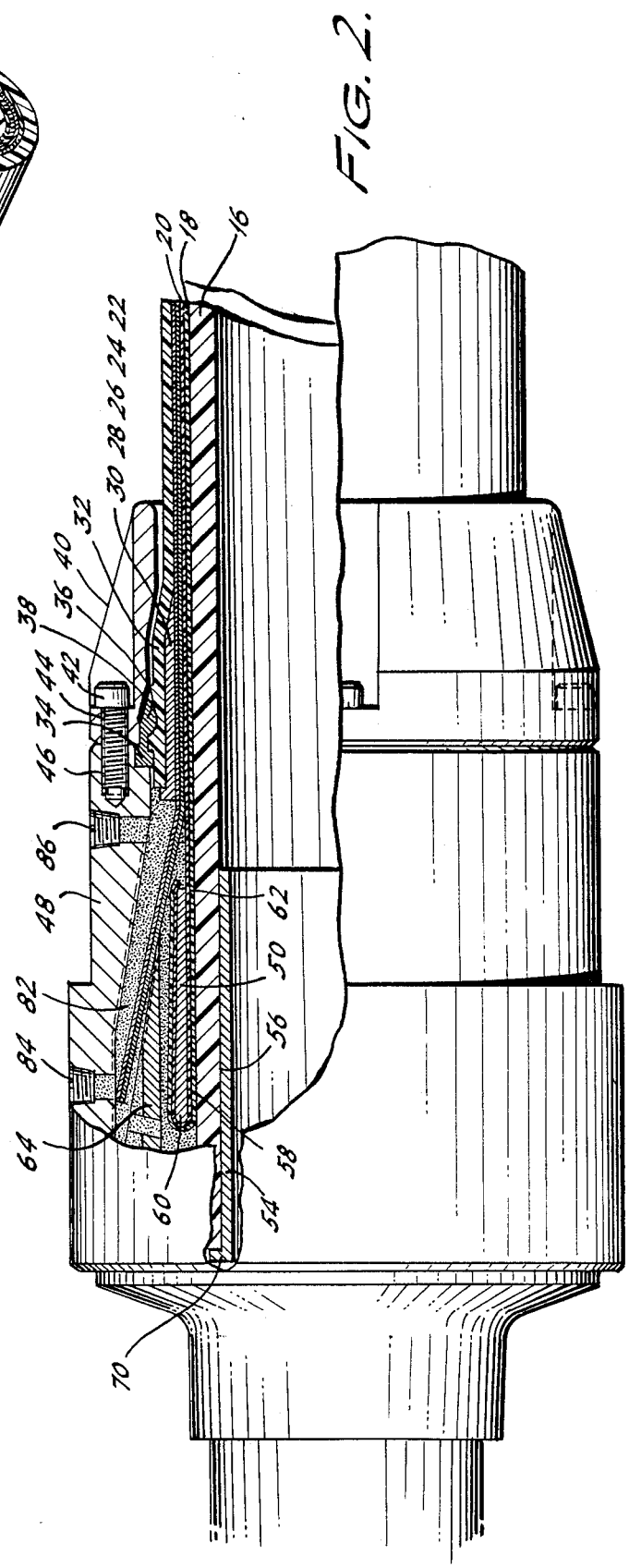
FIG. 2 is a front elevational view of one embodiment of the coupling having a graduated friction anchor for anchoring or terminating aramid fiber reinforcing layers of flexible composite pipes, partly shown in section.

FIG. 2 shows a large portion of the interior as well as the exterior of coupling 12 as it is mounted on pipe 10. In this embodiment, pipe 10 consists of core tube 16, inner aramid fiber layer 18 surrounding core tube 16, tape layer 20 covering inner aramid fiber layer 18, outer aramid fiber layer 22 surrounding tape layer 20, inner armor wire layer 24 covering outer aramid fiber layer 22, outer armor wire layer 26 oppositely helically wound about inner armor wire layer 24, and pipe jacket 28 which surrounds outer armor wire layer 26.

Jacket sleeve 30 is positioned between outer armor wire layer 26 and loose pipe jacket portion 32 to form a base against which loose pipe jacket portion 32 is compressed by jacket ferrule 34. Jacket ferrule arm 36 deforms into loose pipe jacket portion 32 thereby sealing it within coupling 12. Curved surface 38 of outer compression sleeve 40 presses against jacket ferrule arm 36 and deforms it into loose pipe jacket portion 32.

Curved surface 38 is drawn into jacket ferrule arm 36 by a plurality of bolts 42 which pass through outer compression sleeve holes 44 in outer compression sleeve 40 and into housing holes 46 of housing 48.

Graduated friction anchor 50 is positioned between outer aramid fiber layer 22 and inner armor wire layer 24. End portions 52 of both aramid fiber layers 20 and 24 are folded back over graduated friction anchor 50. It is also possible to provide further composite layers for pipe 10 and maintain the effectiveness of anchor 50. For example, another tape layer can be interposed between outer aramid fiber layer 22 and inner armor wire layer 24.

Liner sleeve 54 is placed within the end of pipe 10 and adjacent to core tube 16 such that the outer surface 56 of liner sleeve 54 is inclined relative to the inner surface 58 of graduated friction anchor 50. Liner sleeve 54 wedges core tube 16 outward against inner aramid fiber layer 18, thereby creating compression against both aramid fiber layers 18 and 22 and both tape layers 20 and 23 such that greater pressure is created at end 60 of graduated friction anchor 50 and less pressure is generated at end 62 of graduated friction anchor 50.

Housing 48 is threaded over an integral ferrule (not shown) to create chamber 82 to receive epoxy resin through epoxy fill hole 84 for anchoring armor wire layers 24 and 26, and end portions 52 of aramid fiber layers 18 and 22. Air hole 86 is provided so that air displaced by the addition of the epoxy resin through epoxy fill hole 84 can escape. Both epoxy fill hole 84 and air hole 86 are plugged after the application and setting of epoxy resin.

Figure 3:
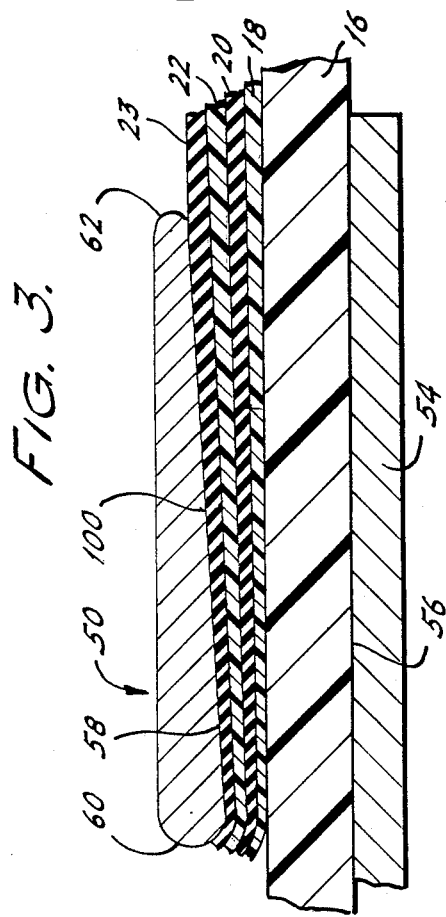
FIG. 3 is an exploded view of an embodiment of a portion of the coupling and graduated friction anchor in accordance with the present invention as shown in FIG. 2.

FIG. 3 shows anchor 50 in one typical position relative to liner sleeve 54 after installation. In this embodiment, inner surface 100 of anchor 50 is angled relative to outer surface 56 and inner surface 58 of liner sleeve 54. With liner sleeve 54 acting as a base, anchor 50 applies graduated force to tape layers 20 and 23 and aramid fiber layers 18 and 22. End 60 of anchor 50 creates greater pressures on the layers 18, 20, and 22 than end 62. It is preferred that the amount of pressure applied at end 60 be about twice the amount of pressure applied at end 62. Such pressure compresses the layers and decreases their respective thicknesses. The pressures exerted between ends 60 and 62 increase gradually from end 62 to end 60.

Coupling 12 which contains graduated friction anchor 50 is quickly and easily assembled by following the procedure which will now be set forth. All necessary coupling parts should be collected, inspected and cleaned. Referring generally to FIG. 2, it is desirable to pre-install an integral ferrule into housing 48. A further step is to check and indicate by marking on the integral ferrule the positions of epoxy fill hole 84 and then disassemble.

The following further assembly instructions typically apply: Strip 12 inches of pipe jacket 28 from the end of pipe 10. From the end of pipe jacket 28, measure back toward the end of pipe 10 for a distance of 6½ inches and cut away both armor wire layers 24 and 26. Do not damage aramid fiber layers 18 and 22.

Slide outer compression sleeve 40 and jacket ferrule 34 onto pipe 10. Install an expanding mandrel into the end of pipe 10 and tighten. Wrap the ends of aramid fiber layers 18 and 22 in a plastic bag and insert into the end of pipe 10. Wrap any exposed portions of aramid fiber layers 18 and 22 with clear tape.

Install jacket sleeve 30 over armor wire layers 24 and 26 and lubricate. Jack jacket sleeve 30 into position between pipe jacket 28 and outer armor wire layer 26 with a jacket sleeve mounting cylinder and a hydraulic pump. Slide housing 48 over the end of pipe 10 and back out of the way. Bend armor wire layers 24 and 26 back and clean them with solvent.

Slide graduated friction anchor 50 over the end of pipe 10 to a point about 2⅝ inches back from the end of core tube 16. Tape graduated friction anchor 50 in place at the inner edge.

Unwrap aramid fiber layers 18 and 22 and carefully cut away any optional tape layer placed between outer aramid fiber layer 20 and inner armor wire layer 24. Back to the leading edge of graduated friction anchor 50. Lay outer aramid fiber layer 22 back over graduated friction anchor 50. Carefully cut inner tape layer 20 back to the leading edge of graduated friction anchor 50. Lay inner aramid fiber layer 18 back over graduated friction anchor 50.

With the expanding mandrel still in place, liner sleeve 54 can be inserted. Cut a chamfer on the inner diameter of core tube 16 and lubricate the inner surface of core tube 16 and the outer surface of liner sleeve 54 with grease. Jack liner sleeve 54 into place with a hydraulic jack. The distance between graduated friction anchor 50 and lip 70 of liner sleeve 54 should be about 3–3¼ inches.

Slide inner compression sleeve 64 (partially shown) onto the end of pipe 10, but not past graduated friction anchor 50. Coat the integral ferrule with silicon lubricant and slide onto the end of pipe 10 with epoxy fill hole marks upward. Tap lightly the integral ferrule until it butts up against lip 70. Coat a plurality of bolts with silicone lubricant and install into corresponding inner compression sleeve holes and into corresponding holes in the integral ferrule. Tighten bolts evenly and draw inner compression sleeve 64 uniformly toward the integral ferrule until they are bolted together.

Secure with small screws several armor wires from armor wire layers 24 and 26 into inner compression sleeve 64. Bend remaining armor wires down over inner compression sleeve 64. Anchor the ends of armor wire layers 24 and 26 temporarily into place with a hose clamp.

Liberally apply pipe thread sealant to the threads on the outward face of the integral ferrule. Apply epoxy blocking caulk around the edge of jacket sleeve 30 and into armor wire layers 24 and 26. Slide housing 48 over armor wire layers 24 and 26 and remove the temporary hose clamp. Thread housing 48 onto the threads provided on the integral ferrule until tight. Epoxy fill hole 84 should be facing upward.

Coat the rear surfaces of housing 48 with pipe sealant. Similarly coat the forward surface of jacket ferrule 34 with pipe sealant. Coat the rearward surfaces of jacket ferrule 34 with silicone lubricant. Similarly coat bolts 42 with silicone lubricant.

Slide outer compression sleeve 40 up over jacket ferrule 34 and install bolts 42 into outer compression sleeve holes 44 and housing holes 46. Tighten bolts 42 evenly and draw outer compression sleeve 40 uniformly toward jacket ferrule 34 and housing 48 until outer compression sleeve 40 and housing 48 are bolted together.

Angle coupling 12 downward and mix two six pound batches of epoxy resin. Pour epoxy into epoxy fill hole 84. Allow to burp for 15 minutes. Plug air hole 86 and level coupling 12, fill as required, then plug epoxy fill hole 84. Reangle coupling 12 downward and let stand for 24 hours.

It is to be understood that the foregoing assembly description is illustrative in nature and not intended to be limiting since various modifications may be made as to dimensions, structures and sequences of events.

Although this invention has been described in the entire specification in connection with specific forms thereof, it will be appreciated that a wide array of equivalents may be substituted for those specific elements shown and described herein without departing from the spirit and scope of this invention as described in the appended claims.

I claim:

1. In a pipe coupling having a free end for releasable connection to another coupling, the combination which comprises:
   an elongated flexible pipe core adapted to be positioned within said coupling;
   a layer of aramid fibers exteriorly disposed about and extending along said pipe core;
   an anchor ring surrounding portions of said aramid fibers and the pipe core and having an inner surface, an outer surface, a curved end portion proximate said free end and a curved end portion away from said free end, said curved end portions connecting said surfaces, said aramid fibers extending along said inner surface, said curved end portion proximate said free end and said outer surface;
   a wedge ring wedged against an inwardly facing portion of said flexible pipe core, said flexible pipe core expanding radially outwardly against said aramid fibers in response to wedging force from said wedge ring;
   said inner surface of said anchor ring being inclined relative to the outer surface of said wedge ring such that the distance between said inner surface and said wedge ring decreases toward said free end, whereby graduated compression forces acting between said anchor ring and said wedge ring through said radially expanded flexible core are imposed upon said aramid fibers located intermediate said flexible core and said wedge ring.

2. A coupling as defined in claim 1, wherein an end portion of said aramid fiber layer extends around said outer surface of said anchor ring.

3. A coupling as defined in claim 1, wherein said inner surface of said anchor ring is substantially smooth.

4. A coupling ring as defined in claim 1, wherein a portion of said outer surface of said anchor ring is knurled.

5. A composite pipe and a graduated friction anchor for mounting on an end of said composite pipe having a free end, said composite pipe having a pipe core and an aramid fiber layer, said aramid fiber layer possessing poor crush resistance properties and said graduated friction anchor being positioned around the pipe core and the aramid fiber layer to securely yet delicately anchor said aramid fiber layer in conjunction with a wedge ring located radially inwardly of said pipe core at said free end, said graduated friction anchor comprising:
   an anchor ring having outer and inner surfaces connected by a curved end proximate said pipe free end and a curved end away from said pipe free end, said inner surface being inclined with respect to the surface of said wedge ring, said aramid fiber layer being positioned along said outer surface, around said curved end proximate said pipe free end and intermediate said anchor ring and said pipe core, said wedge ring being wedged within said pipe core to radially expand said pipe core outwardly toward said aramid fiber layer and to wedge said aramid fiber layer between said pipe core and said anchor ring, thereby generating graduated compression along said aramid fiber layer in a longitudinal direction.

6. A graduated friction anchor as defined in claim 5, wherein an end portion of said aramid fiber layer extends around said outer surface of said anchor ring.

7. A graduated friction anchor as defined in claim 5, wherein said inner surface of said anchor ring is substantially smooth.

8. A graduated friction anchor as defined in claim 5, wherein a portion of said outer surface of said anchor ring is knurled.

9. In a pipe coupling having a free end for releasable connection to another coupling, the combination comprising:

an elongated flexible pipe core adapted to be positioned within said coupling;

a layer of aramid fibers exteriorly disposed about and extending along said pipe core;

an anchor ring surrounding portions of said aramid fibers and the pipe core and having inner and outer surfaces connected by a curved end proximate said free pipe end and a curved end away from said free pipe end, said aramid fibers extending along the inner surface, the curved end proximate said free pipe end and the outer surface, with the unsurrounded portion of said aramid fibers at the curved end of the anchor ring away from said free pipe end not extending substantially radially beyond said inner surface at the curved end of the ring as said unsurrounded fibers extend along said pipe core;

a wedge ring wedged against an inwardly facing portion of said flexible pipe core, said flexible pipe core expanding radially outwardly against said aramid fibers in response to wedging force from said wedge ring, said wedge ring providing a rigid base for said pipe core against inwardly directed radial force;

said inner surface of said anchor ring being inclined relative to the outer surface of wedge ring such that the distance between said inner surface and said wedge ring is reduced along said inner surface toward said free end, whereby graduated compression forces generated between said anchor ring and said wedge ring acting through said flexible pipe core are imposed upon said aramid fibers located intermediate said flexible pipe core and said wedge ring.

10. A coupling as defined in claim 9, wherein a portion of said aramid fiber layer extends around an outer surface of said anchor ring.

11. A coupling as defined in claim 9, wherein said inner surface of anchor ring is substantially smooth.

* * * * *